United States Patent

Breil et al.

[11] Patent Number: 5,996,196
[45] Date of Patent: Dec. 7, 1999

[54] SPEED ADJUSTING APPARATUS FOR PLASTIC DRAWING INSTALLATIONS

[75] Inventors: Jürgen Breil, Grabenstätt, Germany; Günter Oedl, Salzburg; Paul Lindner, Henndorf, both of Austria; Ulrich Rühlemann, Grabenstätt; Bernd Sieber, Dresden, both of Germany

[73] Assignee: Bruckner Maschinenbau GmbH, Siegsdorf, Germany

[21] Appl. No.: 08/750,421

[22] PCT Filed: Apr. 4, 1996

[86] PCT No.: PCT/EP96/01491

§ 371 Date: Feb. 25, 1997

§ 102(e) Date: Feb. 25, 1997

[87] PCT Pub. No.: WO96/31334

PCT Pub. Date: Oct. 16, 1996

[30] Foreign Application Priority Data

Apr. 7, 1995 [DE] Germany ............... 195 13 301

[51] Int. Cl.⁶ ............... B29C 55/02; B29C 55/16
[52] U.S. Cl. ............... 26/93; 26/51; 26/71; 26/89; 425/3; 425/214
[58] Field of Search ............... 425/3, 214; 264/479, 264/484, 211.12, 288.4, 290.2; 26/51, 71, 89, 90, 93

[56] References Cited

U.S. PATENT DOCUMENTS 3,247,544  4/1966  Bromley ............... 26/73
5,072,493  12/1991  Hommes et al. ............... 26/72

FOREIGN PATENT DOCUMENTS

| 0198799A1 | 4/1986 | European Pat. Off. |
| 2924255A1 | 6/1979 | Germany |
| 3023505 | 6/1980 | Germany |
| 19513301 | 4/1995 | Germany |
| 591378 | 7/1975 | Switzerland |

*Primary Examiner*—Jan H. Silbaugh
*Assistant Examiner*—Michael Poe
*Attorney, Agent, or Firm*—Nixon & Vanderhye

[57] ABSTRACT

An improved apparatus for adapting speed, in particular for nippers (1) which can be made to travel along a rail arrangement (3), is distinguished by the following features

- a rotating and electrically conductive eddy-current body (17), preferably designed in the form of an eddy-current wheel or an eddy-current cylinder, is provided,
- the guide rail arrangement (3) runs at least over and away from a partial region of the eddy-current body (17) with a tangential component,
- on the carriages (1) which can be made to travel along the guide rail arrangement (3) there is provided or can be excited at least one magnet (7a, 7b), which is arranged on the side facing the eddy-current body (17) and, in the region of the eddy-current body (17), can be moved over and away from the eddy-current body (17), with an air gap being formed.

18 Claims, 5 Drawing Sheets

SPEED ADJUSTING APPARATUS FOR PLASTIC DRAWING INSTALLATIONS

BACKGROUND OF THE INVENTION

The invention relates to an apparatus for adapting the speed of carriages which can be moved along a rail arrangement, in particular for nippers which can be made to travel along a rail arrangement for the continued transporting of a moving material web, preferably in a plastic drawing installation.

For example in longitudinal or simultaneous drawing installations for plastic film webs, the film web to be drawn is gripped in the run-in region by nippers which are provided on the left and right sides of the moving material web and are advanced along on the circulating guide track with increasing acceleration and increasing spacing from one another. In the so-called run-out zone after ending the stretching operation, the nippers release the edge of the plastic film web and return on a circulating track to the run-in region.

In the run-out region in particular (but not only there), there is the problem that the individual nippers have to be braked again to a lower speed.

Such a problem arises, for example, in a simultaneous drawing installation known from U.S. Pat. No. 5,072,493, in which the nippers or nipper carriages are driven and made to travel along a guide rail system by means of linear motors. In particular at the transition from the return to the run-in reversal, in this case the individual nipper carriages, which can be made to travel separately and independently of one another by means of a linear motor drive, are switched over again to a different speed level.

Specifically in the case of nippers driven by linear motors, it is possible in principle to perform the desired braking action, for example in the run-out region (onto which the nippers are thus returned again to the run-in region on a curved track), likewise by means of the linear motors provided. In such a case, the linear motors could be used on the operating principle of a hysteresis motor. In this case, the linear motors located in the return push the nippers (which bear a magnetic material with hysteresis) through the run-in reversal, in the region of which no drive is provided. The arrangement, simple in itself, has the disadvantage that the nippers can no longer be influenced in their movement sequence over a relatively long line, and that magnetic material with hysteresis properties has to be additionally applied to the nippers. The forces which can be generated by the hysteresis effect are low, for which reason there must be a relatively long driving line in order to reach the final forces required.

For this reason, it has been proposed to provide a wheel having a friction lining on the circumference at a run-out reversal in such a way that the nippers are pressed against the friction wheel and, due to the frictional engagement, follow the movement of the wheel in the circumferential direction. However, a disadvantage of such mechanical device is the inevitable wear at the friction point, which increases in particular with the magnitude of the difference in speed between the speed of the nipper and the circumferential speed of the wheel. Further, an additionally high stress occurs at the contact point of nipper and running rail. In the case of a change of friction lining, the entire installation must be switched off.

In a further installation, known from U.S. Pat. No. 3,247,544, the nippers are positively taken along by radial chambers which are located on a wheel. The speed changes due to a radial movement on the wheel rotating at constant speed. Here too, the speed adaptation thus takes place mechanically, the wear occurring in this arrangement at the contact point between the chambers and the nipper. It is not possible to compensate for different spacings between nippers. The differences in the speeds between the wheel and the nipper in this case result in collisions at the run-in.

SUMMARY OF THE PRESENT INVENTION

The object of the present invention is therefore to provide an improved apparatus in which carriages which can be made to travel along a rail arrangement, and in particular nippers which can be made to travel individually along a rail arrangement, can be moved, braked and/or accelerated in an improved way, to be precise preferably in the region of a section of line having a curved section. In particular, it is to be possible with simple means to reduce in a deliberately selective manner the spacing between two running-in nippers up until the nippers come into contact.

By means of the invention, it is possible with simple means to compensate for existing different speeds between the individual carriages or nippers, i.e. in particular in the case of a plastic simultaneous drawing installation to reduce the spacing between two nippers in the run-out region up until the nippers come into contact. As a result, it is also possible according to the invention to alter the spacing between two nippers down to zero, in order to form the so-called stack (i.e. an arrangement of nippers in series) in such a way that the individual nippers make contact with one another and the nippers respectively running in last propel further the nippers running ahead in the advancing direction, by transferring an advancing force.

The invention can be put into practice in a surprisingly simple way in comparison with conventional solutions.

The essence of the invention is that an eddy-current wheel known per se is used. The guide section runs for part of its length, generally in the form of a curve, over this eddy-current wheel, a magnet arrangement being provided on the nippers. The effect is, however, that not only are nippers which are moving at a higher speed than the tangential circumferential speed of the eddy-current wheel braked thereby but also, conversely, nippers at a lower speed than the corresponding tangential circumferential speed of the eddy-current wheel are accelerated thereby. In other words, whenever relative speeds occur between the eddy-current wheel and the nipper advanced thereby, there occur in the wheel eddy currents, the effect of which the nippers are either braked, accelerated or moved on at the same rate, depending on the direction and magnitude of the relative speed. As a result, there takes place an automatic adaptation of the different speeds of the running in nippers toward a common nipper speed desired as being optimal.

The desired final speed can be set by setting a desired driving speed for the eddy-current wheel.

It proves to be particularly favorable that the energy generated by the braking effect of the running-in nippers braked by the eddy-current wheel is imparted to the eddy-current wheel. This energy can be imparted again from the eddy-current wheel to the nippers located in the stack, so that advancing forces are introduced via the braked nippers running in last, by means of which the run-together nippers located in front are further advanced.

By virtue of this favorable energy balance, only as much energy as is necessary for maintaining the movement of the eddy-current wheel is to be drawn from the power supply system. If the braking effect proves to be greater overall than the energy required for the eddy-current wheel, a feeding back of energy into the power supply system can take place.

The main advantages are thus firstly the contactless transfer of the forces from the nipper to the eddy-current wheel, or vice versa, and with an efficiency which is most favorable from energy aspects. Also, further synchronization measures are required. In particular, however, the nippers themselves require no additional parts for this advantageous effect to be put into practice and realized.

Consequently, the solution overall may also be described as extremely cost-effective.

Arrangements for braking moving parts by means of eddy currents have of course long been known per se. However, common to all these arrangements is a single fixed part (namely the magnets fitted on both sides of the electrically conductive eddy-current wheel) and a movable part (namely the rotating eddy-current wheel). In the rotating electric wheel or disk, the fixed magnets cause eddy-currents to be induced, which, as is known, have a braking effect. Such arrangements are disclosed, for example, in DE 29 24 225 A1 and CH 59 13 78.

Arrangements which are similar in principle are also used in so-called induction couplings. In this case, torques are transferred between two shafts by means of the force effects of the eddy currents.

In the present invention, however, the physical effects of eddy-current formation are used for the purpose of individually braking carriages in a deliberately selective manner, i.e. in the particular case of a film drawing installation To accomplish this, two magnets of differently directed polarity with respect to the eddy-current body are preferably carried by the moving carriages/nippers. However only a single magnet may be used. The eddy-current body itself preferably consists of highly conductive material (for example copper), which itself does not have to be ferromagnetic. Underneath this electrically conductive layer or the electrically conductive eddy-current body itself, a magnetic return is preferably provided using a ferromagnetic material. The eddy-current body may, however, similarly consist of ferromagnetic material which is coated with a thin conductive layer, for example of copper, on the side facing the moving carriages. Also however, an eddy-current body which consists of ferromagnetic material which is electrically as highly conductive as possible, may be used so that a separate magnetic return is not necessary.

Finally, it is also possible according to the invention to provide compensation devices in order to compensate at least to some extent for the forces of attraction which are produced by the magnetic interaction between the one magnet, provided at least in each case on the moving carriages, and the eddy-current body or the magnetic return provided on the eddy-current body.

The principle according to the invention may be used in multiple embodiments, for example also in the plastic film drawing installation on the circulating rail arrangement. Use is even possible in a case where in principle the line follows a straight route.

BRIEF DESCRIPTION OF THE DRAWING FIGURES

The invention is described in more detail below with reference to drawings, in which specifically.

DESCRIPTION OF A PREFERRED EMBODIMENT

The apparatus described with reference to FIGS. 1a and 1b may be used, for example, in a simultaneous plastic film drawing installation, as the latter is known in principle according to U.S. Pat. No. 5,072,493.

The present invention provides in a simultaneous drawing installation effecting transverse and longitudinal drawing, a plastic film web to be drawn which is laterally gripped at an edge in a run-in region by nippers which travel on a circulating rail arrangement. The film is stretched in the longitudinal and transverse directions in the following drawing region and is released again at the run-out region. Thereafter, the nippers are returned again to the run-in via a run-out reversal, with forming of the so-called stack region and reduction of the nipper spacing to zero (so that the nippers are advanced with contact between one another).

Figure 1A:
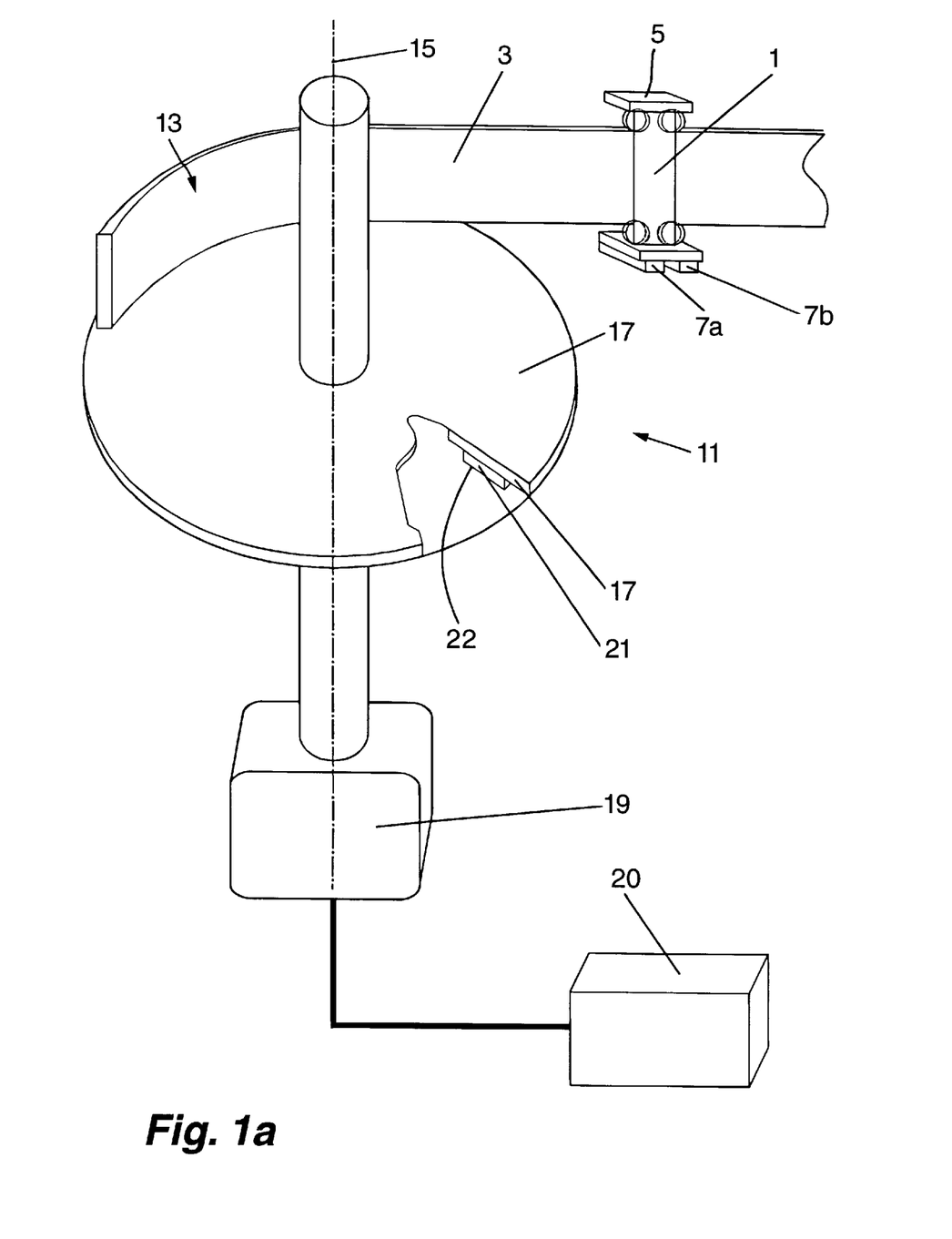
FIG. 1a is a diagrammatic perspective illustration explanatory of the operating principle of the present invention.
Figure 1B:
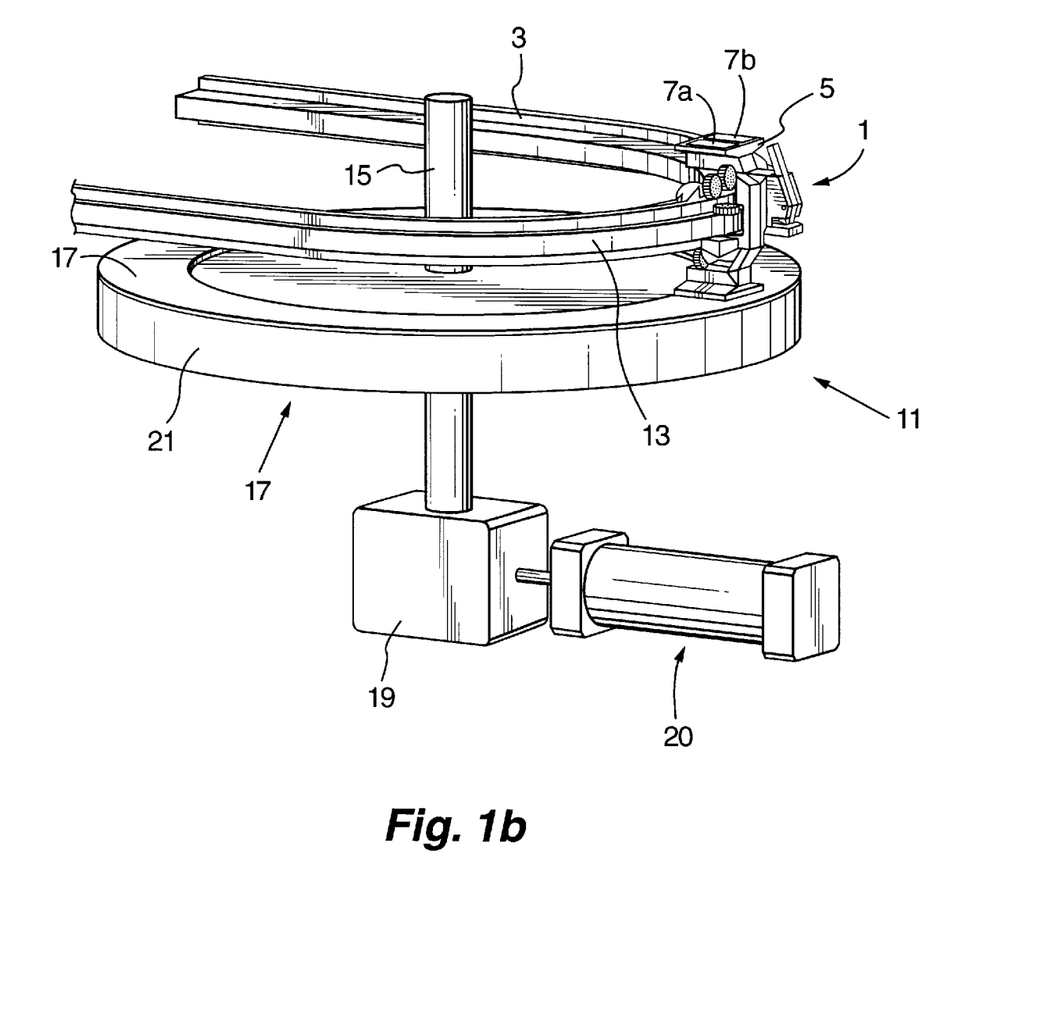
FIG. 1b is a perspective view corresponding to FIG. 1a, reproduced in greater detail.

In FIG. 1, a run-out of a simultaneous plastic film drawing installation is shown, as the latter is provided on one side of the advanced material web.

Illustrated in FIGS. 1a and 1b by way of example and in simplified form is a nipper, or a nipper carriage 1, which is moved along a guide rail 3, which is sometimes also referred to as a guide rail arrangement. As indicated in FIG. 1b, usually provided on the nipper carriage is a nipper lever and a nipper table, on which the edge of a material web to be advanced can be gripped and tensioned.

The nipper carriage 1 indicated in FIG. 1a and shown more in its actual form in FIG. 1b, has on its underside two permanent magnets 7a and 7b, directed with different polarity in the vertical direction with respect to the nipper carriage 1. In the following exemplary embodiment, reference is made to permanent magnets, it will be appreciated that electrically excitable magnets, in particular coil magnets, may of course also be used. As a rule, an arrangement corresponding in principle and likewise using, for example, two magnets may also be provided on the upper side 5.

Linear-motor drives may be provided as the driving devices, these drives being provided for example along the guide line of the track underneath the magnets 7a, 7b, with a small air gap from the latter. If corresponding magnets are also provided on the upper attachment plate 5, an additional linear-motor drive may also be provided above the nipper carriage 1. By this means, the individual nippers can be driven and advanced on their circulating track in a controlled manner, for example in a way corresponding to U.S. Pat. No. 5,072,493. To this extent, reference is made, for example, to the disclosure of this U.S. Pat, No. 5,072,493.

In the return or run-out region 11, after release of the moving material web, not shown in any more detail in FIG. 1, the individual nipper carriages 1 then run into a curved section 13 of the guide rail arrangement 3. The installation further comprises an eddy-current wheel 17, which is rotatable about a vertical axis 15 and is electrically conductive. This wheel is driven by means of a motor 19. The motor is in this case able to be operated, for example, in all four quadrants of the speed-torque field. It is also possible at any time to use a different eddy-current wheel, which for example may comprise material which in principle is non-conductive, provided that a conductive surface or layer is provided on this eddy-current wheel. In this case, preferably highly conductive non-ferromagnetic materials are used, such as for example copper.

The eddy-current wheel 17 is arranged at the run-out reversal (or, for example, similarly in the case of a run-in reversal or at another location) in such a way that the nipper carriages 1 fitted with magnets 7a, 7b running approximately tangentially in the region of the eddy-current wheel 17 and then, on part of the circumference, run around alongside and above the wheel, and leave the latter preferably at least approximately tangentially.

As seen from the drawings, the effective faces of the magnets 7a, 7b are directed parallel to the surface of the eddy-current wheel 17.

In the exemplary embodiment shown according to FIG. 1a, a magnetic return 21 is provided on the underside of the eddy-current wheel 17, i.e., on the side opposite the circulating track of the guide rail 3, and is, fitted securely on the eddy-current wheel, 17. This magnetic return is a material section in the form of an annular strip of magnetically highly conductive material, in particular ferromagnetic material.

The guide rail, the height of the nipper carriages and the wheel are matched to one another and dimensioned in such a way that an at least a small air gap remains between the underside of the permanent magnets 7a, 7b and the upper side of the eddy-current wheel 17.

If, irrespective of their speed, the nipper carriages 1 run into the run-out reversal, the magnetic lines of the permanent magnets 7a, 7b pass through the electrically conductive eddy-current wheel 17. The magnetic lines of force in this case run from the one magnet 7a, provided on the underside of the nipper carriage 1, via the eddy-current wheel 17 and the magnetic co-rotating magnetic return 21 fitted on the underside of the wheel, and from there back through the eddy-current wheel to the second magnet 7b, which is directed with its magnet pole the other way round than the first magnet 7a. On account of the air gap which exists, there is no physical contact between the magnets 7a, 7b and the eddy-current wheel 17.

If relative speeds occur between the eddy-current wheel 17 and the running-in nippers 1, there are produced in the electrically conductive wheel 17 eddy currents, under the effect of which the nippers 1 are braked, accelerated or moved on at the same rate, depending on the direction and magnitude of the relative speed.

If the electric motor 19 to an actuating member 20, a specific rotational speed, and consequently a specific circumferential speed (i.e. a specific circumferential speed in the region of the guide rail 3 with respect to the axis 15) can be set and prescribed.

In the case of the exemplary embodiment according to FIG. 1b, the eddy-current body 17 is designed as a ring. It consists, for example, of copper of a thickness of 2 to 4 mm. The eddy-current wheel 17 according to FIG. 1b, designed in the form of a ring, is fitted on a disk 21, in particular a steel disk 21, which is firmly connected to the drive spindle having an axis 15 and at the same time forms the magnetic return 22. It can also be seen from this that the eddy-current body 17 and the possibly provided magnetic return 22 only have to be provided in an annular region over which, in a segment of a circle, the nipper carriage 1 is moved along over the guide rail 3.

Figure 2:
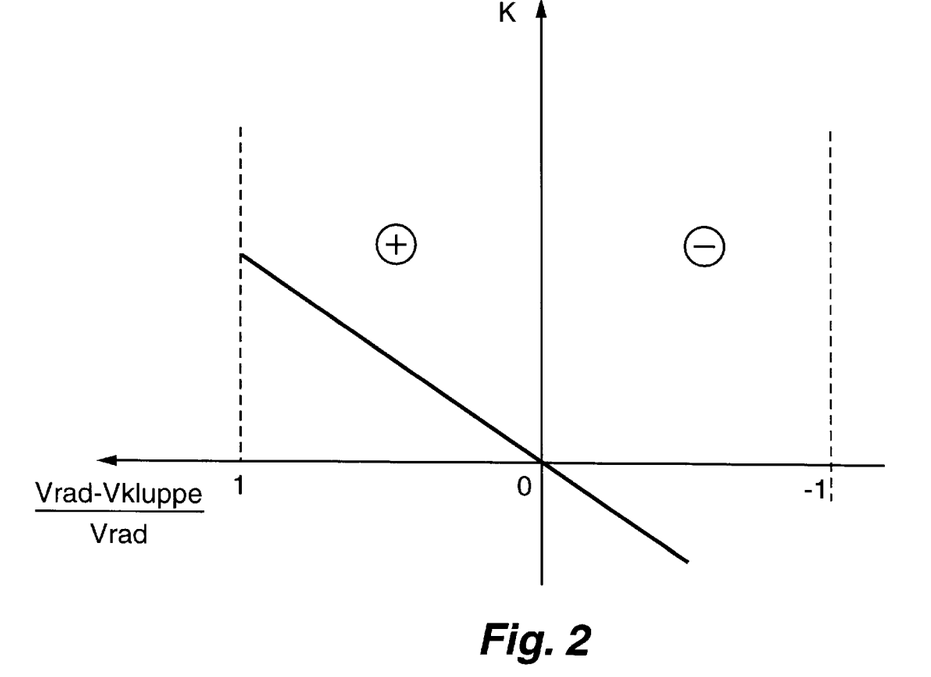
FIG. 2 is a diagram explanatory of the force transfer between nippers and eddy-current wheel.

Illustrates by FIG. 2 way of example the forces acting on the nipper and in which direction the forces occur, or are transferred, at different speeds between nipper 1 and the corresponding circumferential speed of the eddy-current wheel 17.

In FIG. 2, the difference in speed between the circumferential speed of the eddy-current wheel and the speed of the nipper, divided by the circumferential speed of the eddy-current wheel constitute is drawn in over the horizontal axis and the forces K acting on the nipper constitute the vertical axis.

If the circumferential speed $V_{wheel}$ of the eddy-current wheel 17 alongside the guide rail 3, i.e. with respect to the axis 15 at the same radial distance therefrom, is greater than the speed $V_{nipper}$, a force transfer takes place on the basis of the eddy-current effect from the wheel to the nipper, with the tendency to increase the nipper speed. This is marked in FIG. 2 by a plus sign.

If the difference from $V_{wheel} - V_{nipper}$ is negative, i.e. the nipper speed is greater than the relative circumferential speed of the eddy-current wheel 17, the individual nippers 1 are braked and impart their energy to the eddy-current wheel 17.

If the difference in speed between the circumferential speed of the eddy-current wheel and the nipper is zero or approximately zero, the nipper is moved over and away from the eddy-current wheel with virtually neutral force.

Figure 3:
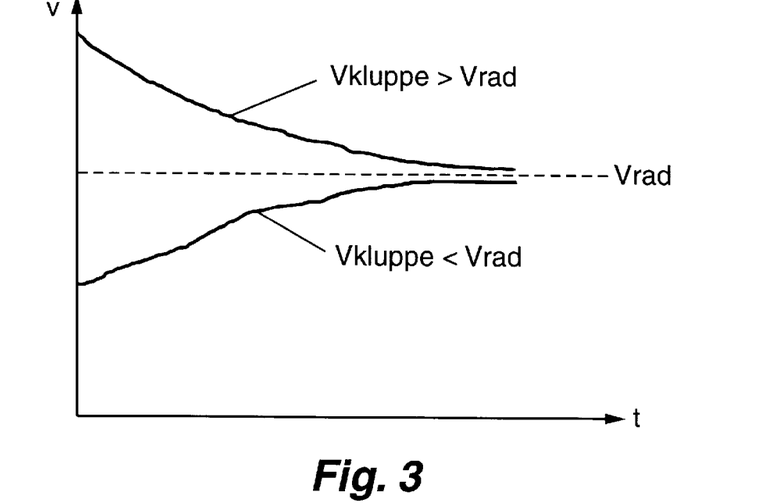
FIG. 3 is a further diagram for illustrating the change in speed of the nippers influenced by means of the apparatus.

By means of FIG. 3, the changing speed with respect to the time t is reproduced for the conditions explained above, lie, in dependence on whether the initial speed of the nipper is greater or 10 less than the circumferential rotational speed of the eddy-current wheel 17. It can be seen from this that nippers running in faster are braked and nippers running in slower are accelerated, both toward a limit value which corresponds to the circumferential speed of the eddy-current wheel 17 alongside the guide rail 3 (that is to say in the direct coupling region with respect to the permanent magnets 7a, 7b).

The speed limit value mentioned above, to which the running-in nippers are accelerated or braked, may be correspondingly set and prescribed by the actuating member. However, even if a non-motor-derivable eddy-current wheel were used, the interaction between the running-in nippers and the eddy-current wheel would set the latter in rotation to a certain extent, until there is established an average speed, at which the energy transferred from the braked nippers to the eddy-current wheel and the energy imparted via the eddy-current wheel to the slower nippers (disregarding frictional losses) are in dynamic equilibrium.

Particularly favorable results are obtained if the thickness of the eddy-current wheel 17 is approximately the same size as the air gap. In this case, electrically conductive, wherever possible non-ferromagnetic, material is used for the eddy-current wheel 17.

As a departure from the eddy-current wheel 17 represented in the drawing, an eddy-current cylinder 17 of comparatively thick dimensions may also be used In this case, the lateral cylinder surface bears a plating of electrically conductive material, underneath which the magnetic return represented in the drawing is arranged. The effective faces of the magnets are in this case not perpendicular to the axis 15, but parallel thereto, i.e. directed virtually parallel to the cylindrical shell surface.

It can be seen from the last-mentioned example that the eddy-current body may be designed not only in the form of a wheel and not only in the form of a cylinder or a cylinder shell, but also with a different form of a body of revolution. For example the eddy-current body may be in the form of a cone or a truncated cone, the effective faces of the magnets 7a, 7b being adapted to the corresponding inclination and direction of the surface of the eddy-current body, with a small air gap being formed.

Figure 4:
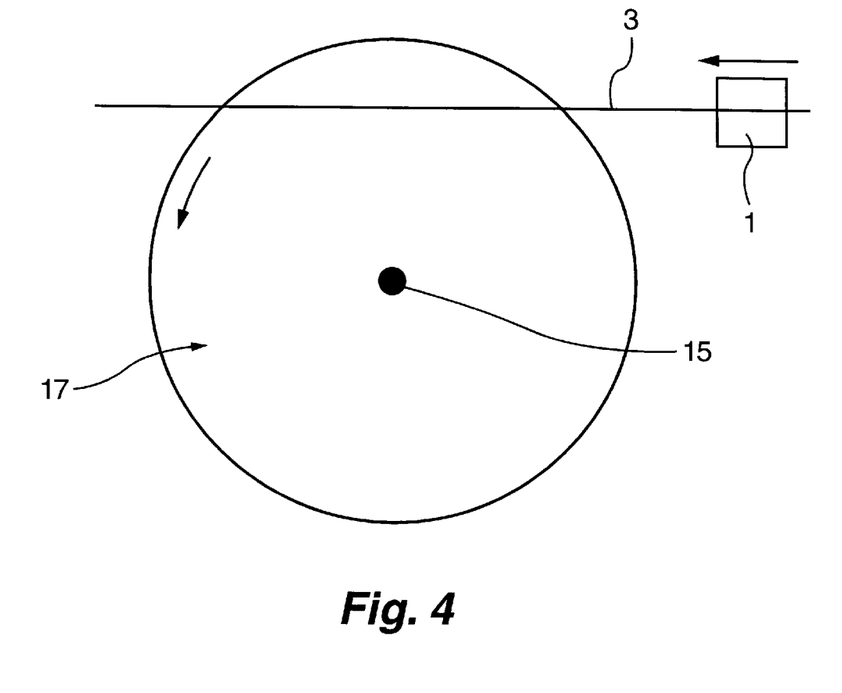
FIG. 4 is a diagrammatic plan view illustrating the present invention a line running substantially over a straight route.

A speed changing apparatus of such a description may, as mentioned, be provided not only in the run-out but similarly in the run-in of, for example, a plastic film drawing installation. It may, however, similarly also be provided at the transitional region from the runin zone to the stretching zone, on which the nippers move as a rule with a component outward from the center longitudinal axis of the film web. Such an apparatus is also possible, however, at other points of a circulating track. In this case it is even conceivable for a guide rail to run in the tangential region straight over and away from such an eddy-current wheel 17, which—in particular given adequately large dimensioning - brings about the effect that in this region the nippers moved past are accelerated or braked or are advanced correspondingly at the same speed, according to a given speed difference between nipper and circumferential speed of the eddy-current wheel 17, as is schematically represented in plan view by means of FIG. 4.

Figure 6:
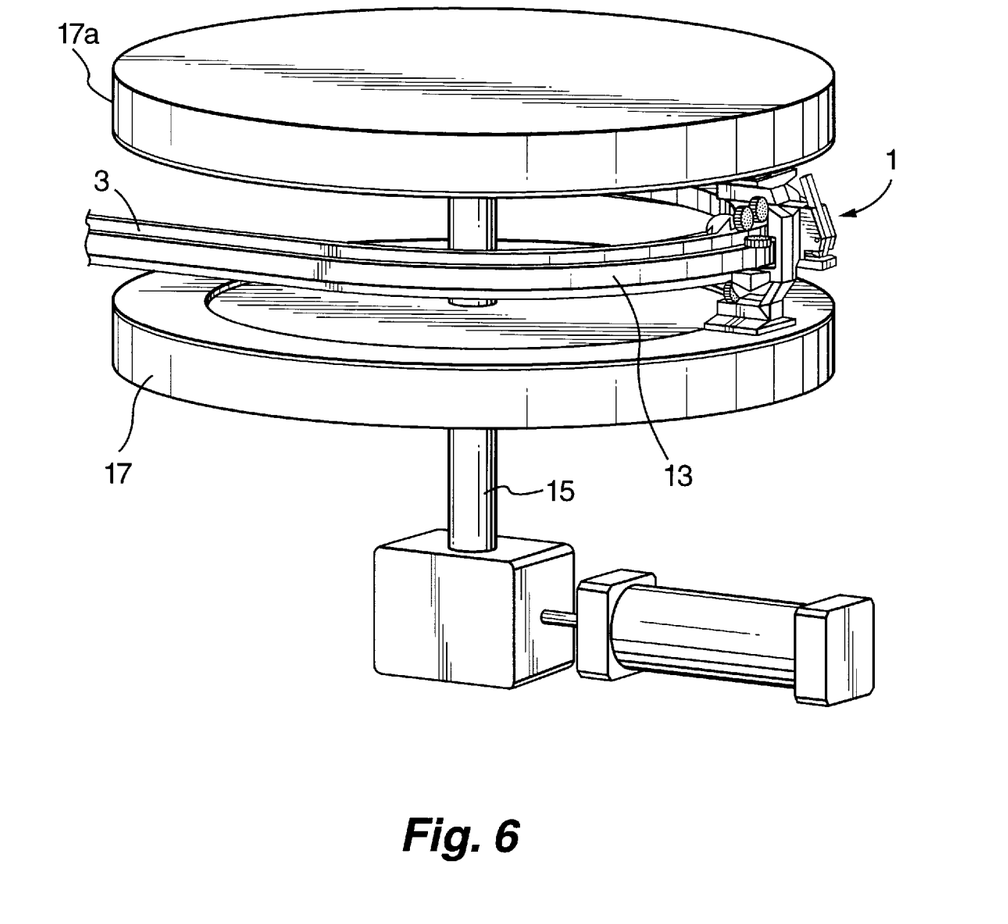

As a departure from the exemplary embodiment shown by means of FIGS. 1a and 1b, improved effects may also be achieved by using a second eddy-current wheel 17a, which is fitted on the same spindle having axis 15 and rotates along with the spindle. In this case, the axial distance between the two eddy-current wheels 17a, lying axially offset with respect to each other, is adapted to the height of the guide rail 3, or the height of the nippers, in such a way that a further pair of magnets is provided on the side opposite the permanent magnets 7a, 7b, so that a double coupling is generated at the two eddy-current wheels 17a. This leads to a more uniform introduction of forces between the pair of eddy-current wheels and the individual nippers.

Finally, in particular when transferring relatively small forces, under certain circumstances it is also possible to dispense with the magnetic return provided on the eddy-current wheel 17 on the side opposite to that of the nippers.

The embodiments explained above also have the major advantage that the magnets described also serve at the same time as magnets (as a rule as permanent magnets although electrically excitable magnets are also possible) for driving if linear motors are used. As a consequence, no additional changes or technical measures have to be carried out on the nipper 1 itself in order to realize the mode of operation here of Finally, it is also diagrammatically shown by means of FIG. 5 that, for example, the nippers may have two magnets 7a, 7b, lying offset with respect to each other at an axial distance, so that the eddy-current wheel 17 enters in a partial circumferential region between the two magnets 7a, 7b. Since it is not absolutely necessary that two magnets 7a, 7b are provided, in the exemplary embodiment according to FIG. 5 the upper magnet 7a is drawn in only by dashed lines.

Figure 5:
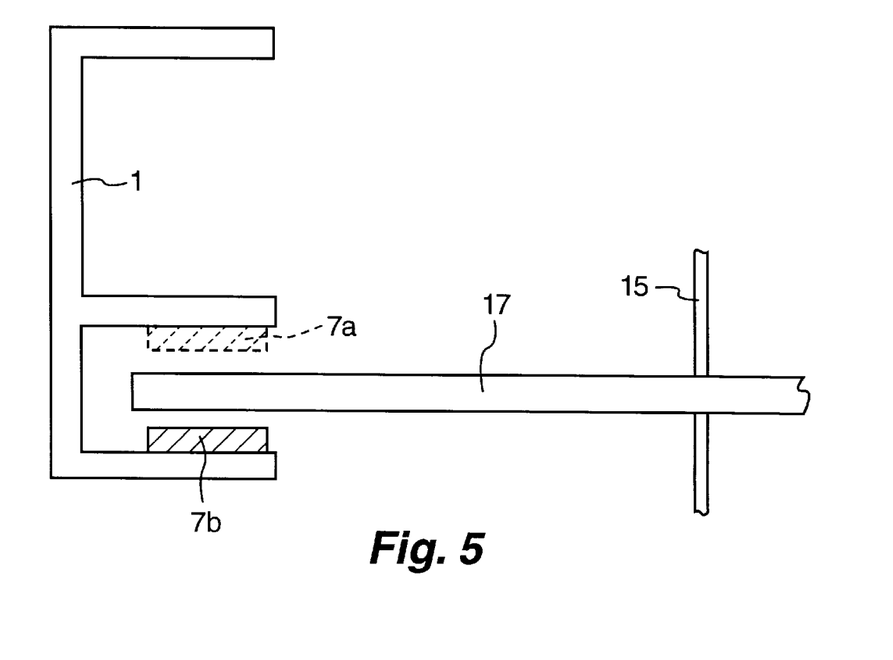
FIG. 5 is a diagrammatic cross-sectional representation in schematic form of a modified exemplary embodiment and FIG. 6 is a perspective view of the device hereof employing two eddy-current wheels.

In this case, it is likewise possible to dispense with the magnetic return, since the lines of the magnetic force field running from one magnet to the other magnet 7a, 7b pass through the eddy-current wheel 17.

The last-mentioned example also offers the advantage that no additional forces of attraction occur between the eddy-current wheel, i.e. as a rule between the eddy wheel 17, and the magnetic return, as a rule anchored there on the rear side, and the magnets 7a, 7b on the nipper.

In order to achieve compensation with respect to the magnetic forces of attraction otherwise occurring between the eddy-current wheel, or the magnetic return at or on the eddy-current wheel, and the magnets 7a, 7b fitted on the nipper (underneath in the exemplary embodiment shown), a corresponding compensation device may be provided. This compensation device may comprise an arrangement comparable to the magnetic return 21, preferably of ferromagnetic material, which is arranged lying offset at an axial distance from the eddy-current 17 in such a way that it generates a further force of attraction, acting in the reverse direction, by magnets provided on the upper side 5 of the nipper carriages 1. For this purpose, a further return, comparable to the magnetic return 22, would be arranged, for example in disk or ring form, in such a way that the magnets provided on the upper side 5 of the nipper carriages 1 would be moved past with a small air gap in the opposite sense to the lower magnets 7a, 7b, i.e. in the exemplary embodiment shown underneath the return there. This additional magnetic return, interacting with the magnets provided on the upper side 5 of the nipper carriages 1, may also be arranged fixedly, since it serves only to compensate for the forces of attraction occurring between the magnets 7a, 7b of the nipper and those of the eddy-current body 17, or the lower magnetic return 22.

We claim:

1. Speed adjusting apparatus for a material web, comprising:

a rotating electrically conductive eddy-current body;

a guide rail extending over and away from a region of said eddy-current wheel and having a tangential component;

carriages carried by said guide rail for transporting the material web;

at least one magnet carried by each of said carriages and disposed on sides thereof facing said eddy-current body and, in said region thereof, said magnet being spaced by an air gap from said eddy-current body whereby said carriages are subject to an eddy-current for adjusting the speed of said carriages relative to a circumferential speed of said eddy-current body.

2. Apparatus according to claim 1 wherein at least one magnet is disposed on each of said carriages such that lines of magnetic flux emanating from two poles of said magnet interact with said eddy-current body.

3. Apparatus according to claim 1 including at least two magnets on the side of said carriages facing said eddy-current body and having different polarity.

4. Apparatus according to claim 1 including at least two magnets carried by each of said carriages, said magnets lying offset in a transverse direction with respect to said guide rail, said eddy-current body extending between said magnets.

5. Apparatus according to claim 1 including two eddy-current bodies spaced axially from one another, said guide rail extending between said eddy-current bodies and magnets on said carriages on both sides thereof respectively facing said eddy-current bodies.

6. Apparatus according to claim 1 including a motor for driving said eddy-current body.

7. Apparatus according to claim 1 wherein said eddy-current body is in drive connection with a motor serving as a generator.

8. Apparatus according to claim 1 wherein the rotational speed of said eddy-current body can be controlled.

9. Apparatus according to claim 1 wherein said eddy-current body is in the form of a body of revolution.

10. Apparatus according to claim 1 wherein said eddy-current body is in the form of a cylinder.

11. Apparatus according to claim 1 wherein said eddy-current body comprises a material which is both electrically conductive and ferromagnetic.

12. Apparatus according to claim 1 wherein a ratio between said air gap and the thickness of said eddy-current body lies between 1:4 and 4:1.

13. Apparatus according to claim 1 wherein the ratio between said air gap and the thickness of said eddy-current body is approximately 1:1.

14. Apparatus according to claim 1 including a magnetic return on the side of said carriages lying opposite said eddy-current body which interacts with said magnet provided on said side of said carriage.

15. Apparatus according to claim 1 including a magnetic return on an opposite side of said eddy-current body from said carriages and in the region of said guide rail.

16. Apparatus according to claim 15 wherein said magnetic return is a material ring fitted to said eddy-current body and which is rotatable therewith.

17. Apparatus according to claim 1 wherein said eddy-current body has an electrically conductive layer on a side thereof facing said guide rail.

18. Apparatus according to claim 17 including a magnetic return under said electrically conductive layer.

\* \* \* \* \*